United States Patent Office 3,655,778
Patented Apr. 11, 1972

3,655,778
METHOD FOR ISOMERIZING PHENYLPHENOLS
Gustave K. Kohn, Berkeley, Calif., assignor to Chevron Research Company, San Francisco, Calif.
No Drawing. Filed Dec. 27, 1968, Ser. No. 787,627
Int. Cl. C07c *39/12*
U.S. Cl. 260—619 R    5 Claims

ABSTRACT OF THE DISCLOSURE

Method for isomerizing monoarylphenols and monoarylmonoalkyl phenols to corresponding isomers in which the position of the aryl group is changed by heating the monoarylphenol or monoaryl monoalkylphenol to about 160–250° C. in the presence of an acid-activated montmorillonite clay.

FIELD OF THE INVENTION

This invention relates to methods for isomerizing monoaryl phenols to their position isomers and preparing phenylalkylphenols.

BACKGROUND OF THE INVENTION o-Phenylphenol is available as a by-product from the Raschig phenol process (hydrolysis of chlorobenzene). U.S. Pat. No. 3,363,008 describes a process for isomerizing o-phenylphenol to its corresponding m-isomer using a Friedel-Crafts catalyst. Stoichiometrically this process requires more than 1 mol of catalyst to complex the o-phenylphenol reactant. The m-phenylphenol isolation, as described in the patent, involves treating the reaction mixture with ice in hydrochloric acid, separating an organic layer, washing that layer with diluted hydrochloric acid, extracting the diethyl ether, drying the ether layer with magnesium sulfate, filtering, evaporating the ether and freshly distilling the product.

p-Phenylphenol is manufactured commercially by a sulfonation-caustic fusion process starting with biphenyl. Chemical Week 102, 025, 78 (Aug. 22, 1968).

INVENTION DESCRIPTION

Monoarylphenols are isomerized to their corresponding position isomers according to the invention process. Thus, o-monoarylphenol may be isomerized to corresponding m- and p-isomers; p-monoarylphenol is isomerized to corresponding o- and m-isomers; and m-monoarylphenol is isomerized to corresponding o- and p-isomers. In this context the term "corresponding position isomer" means a monoarylphenol in which the aryl group is bound to the phenol nucleus in a position different from the position in which that aryl group was bound to the starting monoarylphenol.

It is postulated that the isomerization of this invention occurs stepwise around the phenol nucleus. In other words, o-monoarylphenol is first isomerized to its m-isomer. Upon further treatment this m-isomer isomerizes to the p-isomer. By choosing to give predominantly one isomeric species or a mixture of isomers.

The isomerization of this invention is effected by heating a monoarylphenol in which the aryl group is carbocyclic, of 6 to 18 carbon atoms and bound to the phenol nucleus by a nuclear carbon atom, to about 160–250° C., preferably 180–230° C., in the presence of an acid-activated montmorillonite clay. The aryl radical of the monoarylphenol reactant may be monocarbocyclic or polycarbocyclic. Normally this group will be hydrocarbyl and selected from phenyl, alkylphenyl in which the alkyl is of 1 to 12 carbon atoms or fused ring. Examples of typical aryl radicals which may be involved in this invention are phenyl, tolyl, naphthyl, cumyl, anisyl, phenoxyphenyl, xylyl, butylphenyl, amylphenyl, decylphenyl, dodecylphenyl and naphthylphenyl. The phenol nucleus may also be substituted with one or more groups. Of course, such substitution may limit the movement of the aryl radical; thus decreasing the number of isomers which may be formed. Electron withdrawing groups such as halogens frequently slow the reaction. Consequently, while such electron withdrawing groups may be present, alkyl substituents of 1 to 12 carbon atoms, which do not materially affect the reaction rate, are desirable. Preferably the monoarylphenol reactant is phenylphenol.

Montmorillonite clays which may be used in the isomerization of this invention are well known. Clays of this type are described in U.S. Pat. No. 3,014,079 and applicant's copending application U.S. Ser. No. 757,129, filed Sept. 3, 1968. A preferred group of Montmorillonite clays are those in which the base exchange positions are occupied predominantly by Group II metal cations such as calcium, magnesium, barium, strontium and cadmium, and which contain less than about 1.4 weight percent bound iron calculated as $Fe_2O_3$ on a dry weight basis. Normally, the Group II metal cations in these preferred clays will be calcium or magnesium. The term "bound iron" as used herein means the iron content of the clay as determined by emission spectroscopy after the clay has been treated to remove free iron oxides by the sodium dithionite-citrate-bicarbonate method. This method is described generally by Aguilera and Jackson, S.S.S.A. Proc., 17:359 (1953); 18:223 and 350 (1954).

Examples of naturally occurring montmorillonite clays which are useful in the invention process are those known commercially as Bentolite L, Gelwhite L, Clarolite T–60, Filtaclay 75, Retrol and Tonsil.

For use in the isomerization the above-described clays are activated with acids, usually mineral acids such as sulfuric and phosphoric acids. Certain organic acids such as toluenesulfonic acid may also be used to activate these clays. The clay may be activated prior to adding it to the isomerization mixture; or it may be activated in situ before being added to the isomerization mixture. If activated in situ the clay is desirably dried beforehand until it contains roughly 5 to 8% water by weight. Care should be taken against overdrying the clay since it may cause partial deactivation. Sufficient drying is usually accomplished at 100 to 120° C. for 2 to 3 hours. After drying, the clay is put into the reactant mix together with from about 0.005 to 0.1 g. acid per g. of clay, preferably 0.03 to 0.07 g. acid per g. of clay.

When activated beforehand, the clay is contacted with an anhydrous acid solution such as sulfuric acid in ether. The slurry is filtered and washed repeatedly with solvent to remove excess acid. After a brief drying, the clay is a good isomerization catalyst without adding more acid.

The acid-activated Montmorillonite clays will generally comprise about 10 to 70% by weight of the reaction mixture. More normally, it will comprise about 20 to 50% by weight.

The reaction mixture of monoarylphenol and acid-activated clay is heated rapidly to about 160–250° C. to effect isomerization. Preferably the temperature will be kept between about 180 and 230° C. Although sub- or superatmospheric pressures may be used in this reaction, it is convenient to use atmospheric or autogenous pressure. Under these conditions the isomerization will be completed within about ½ to 2 hours.

The isomerization may be carried out in the presence of diluents such as phenol. However, such diluents are not necessary.

After the isomerization has reached the extent desired, the clay may be filtered from the reaction mixture. The filtrate may then be separated into the various isomers by fractional distillation.

A second aspect of this invention involves the combined alkylation of a phenylphenol and isomerization wherein the phenyl group is moved on the phenol nucleus. This combined reaction produces monophenyl-monoalkylphenols wherein the alkyl radical is of 3 to 18 carbon atoms, by reacting a monophenylphenol with an alkylating moiety, the number of carbon atoms in each alkyl group of said moiety being from 3 to 18, inclusive, at about 160 to 250° C. in the presence of the acid-activated montmorillonite clay described above. Preferably the alkyl groups of the alkylating moiety individually are of 3 to 6 carbon atoms, inclusive, and the reaction temperature is kept in the range of 180 to 230° C. The position of the phenyl group on the phenol nucleus in the monophenyl-monoalkylphenol product is different than the position of the phenyl group on the phenol nucleus in the monophenylphenol reactant.

This reaction may be illustrated by the following equation:

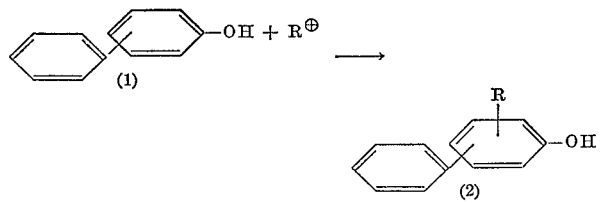

wherein R represents an alkyl carbonium ion of 3 to 18 carbon atoms. The phenyl group in (1) may be o, m or p relative to the hydroxyl group. This phenyl group moves on the phenol nucleus and will occupy a different position in (2). R's position on the phenol nucleus of (2) may be o, p or m relative to the hydroxyl group. (It cannot be para if the phenyl group occupies that position.) Normally the product will be a mixture of the alkyl isomers with the compounds in which R is meta to the hydroxyl being predominant. The phenylphenol reactant may be an o-, m- or p-alkylphenol or mixtures thereof.

The alkylating moiety is a chemical having one or more alkyl groups individually of 3 to 18 carbon atoms, preferably 3 to 6 carbon atoms, which under the conditions of the reaction dissociates to provide alkyl carbonium cations of 3 to 18 carbon atoms, preferably 3 to 6 carbon atoms. Such moieties include alkylphenols, polyalkylphenols and monoalkenes. Specific alkylating moieties include n-propylphenol, isopropylphenol, n-butylphenol, octadecylphenol, sec.-butylphenol, t-butylphenol, sec-amylphenol, n-hexylphenol, sec-hexylphenol, n-octylphenol, hexadecylphenol, 1-butene, 2-butene, 1-pentene, 1-propene, 1-hexene, 2-pentene, 2-hexene, octene, dodecene, 2,4-diisopropylphenol, octadecene, 3,5-diamylphenol, 2,4-dioctylphenol, 2,5-didecylphenol and 2,6-dihexylphenol. Preferably the alkylating moiety will be a high boiling material to facilitate separation of reaction products.

The reaction conditions for this combined alkylation and isomerization are the same as those described above for the simple isomerization of monoarylphenols. Alternatively, it may be desirable to use a lower temperature, e.g., 120–180° C., for the alkylation and then isomerize under the above-described conditions.

The following five examples illustrate the isomerization of this invention. They are not intended to limit the invention described herein. Unless otherwise indicated, percentages are by weight.

EXAMPLE 1

34 g. of o-phenyl phenol was charged to a vessel. 1 g. sulfuric acid and 23 g. montmorillonite clay (Bentolite L) were added and the mixture was heated to 190–195° C. Samples of the reaction mixture were taken at various reaction times and filtered. The filtrates were acylated with acetic anhydride and the acylated product was analyzed by vapor phase chromatography to determine the relative amounts of o-, m-, and p-phenyl phenol present in the filtrate. These assays are tabulated below:

| Reaction time, hrs. | Percent | | |
|---|---|---|---|
| | Ortho | Meta | Para |
| 1 | 65 | 35 | |
| 2 | 35-40 | 30-35 | 30 |
| 4 | 30 | 55 | 15 |
| 6 | 30 | 55 | 15 |

EXAMPLE 2

The isomerization of Example 1 was repeated except that 0.5 g. of sulfuric acid, 10 g. of montmorillonite clay (Bentolite L) were used and the reaction was run at 210° C. The vapor phase chromatographic assays for this isomerization are tabulated below:

| Reaction time, hrs. | Percent | | |
|---|---|---|---|
| | Ortho | Meta | Para |
| 1 | 52 | 32 | 16 |
| 3 | 45 | 37 | 18 |
| 4 | 50 | 28 | 22 |
| 6 | 38 | 42 | 20 |

EXAMPLE 3

The isomerization of Example 2 was repeated except that 2 g. of sulfuric acid and 20 g. of montmorillonite clay (Bentolite L) were employed. After 1 hour reaction time the vapor phase chromatographic assays of the filtrate were 27% ortho, 53% meta and 20% para.

EXAMPLE 4

Using the general procedure described in Example 1, 34 g. of p-phenyl phenol was isomerized using 1 g. sulfuric acid and 20 g. montmorillonite clay (Bentolite L) at 210° C. The chromatographic assays of the filtrate from this isomerization are tabulated below:

| Reaction time, hrs. | Percent | | |
|---|---|---|---|
| | Ortho | Meta | Para |
| .25 | 9 | 18 | 73 |
| .50 | 9 | 51.5 | 39.5 |
| .75 | 10.5 | 53.5 | 36 |
| 1.00 | 21 | 51 | 28 |

EXAMPLE 5

The isomerization conditions of Example 4 were used to isomerize m-phenylphenol. After 1 hour reaction time the chromatographic assays of the filtrate was 13.5% ortho, 56% meta and 30.5% para.

The combined alkylation-isomerization of this invention is illustrated by the following example:

EXAMPLE 6

34 g. o-phenylphenol, 15 g. o-sec. butylphenol and a mixture of 0.5 g. sulfuric acid on 10 g. montmorillonite clay (Bentolite L) were charged to a flask equipped with a stirrer, condenser, heating mantle and thermometer. The combined mixture was heated to 195° C. for 2 hours. This reaction was repeated and the reaction products were combined. The clay was filtered from the combined product and the filtrate was distilled fractionally. 3-sec. butyl-5-phenylphenol was recovered at a pot temperature of 155° C. and a B.P. of 143° C. at 1.0 mm. Hg. The carbon analysis of this compound and calc. 84.43%; found 85.8%.

UTILITY

Aside from the uses described in the art mentioned under Background of Invention, the phenylphenols prepared according to this invention may be used as chemical intermediates to prepare various derivatives. For instance, they may be carbamoylated to make novel carbamates which exhibit biological activity.

The following example illustrates a method for carbamoylating phenylphenols prepared according to this invention.

EXAMPLE 7

10 g. of the 3-sec. butyl-5-phenylphenol prepared in Example 6, 2.5 g. methylisocyanate and 1 drop of triethylamine were mixed in a vial. This mixture was allowed to stand for approximately 60 hours, during which time a crystalline product formed. This crystalline product was recrystallized from hot benzene and hexane in 2 portions; one melting at 91–93.5° C. and the other at 94–96° C. The nitrogen analysis of the former was: calc. 4.95; found 5.50. Infrared analysis indicated this portion was 3-biphenyl-5-sec. butyl-N-methylcarbamate.

This 3-biphenyl-5-sec. butyl-N-methylcarbamate was tested as a post-emergence herbicide at a dosage rate equivalent to about 9 lbs. per acre by a standard foliar application technique against mustard, pigweed and lambs quarter. It gave 100% control of these weeds in these tests. For post-emergence application to such broadleaved weeds in the field, it is expected that these carbamates will be applied directly to the plant foliage and other parts at rates between 1 and 20 lbs. per acre. For such application they will usually be formulated with biologically inert liquid diluents, wetting agents and the like.

What is claimed is:

1. Process for isomerizing monoarylphenol to its corresponding position isomers which comprises heating a monoarylphenol in which the aryl group is carbocyclic, of 6 to 18 carbon atoms and bound to the phenol nucleus by a nuclear carbon atom to about 160 to 250° C. in the presence of an acid-activated montmorillonite clay.

2. The process of claim 1 wherein said monoarylphenol is heated to 180 to 230° C. and the acid-activated montmorillonite clay comprises about 10 to 70 percent by weight of the reaction mixture.

3. The process of claim 1 wherein the aryl group of the monoarylphenol is composed solely of hydrogen and carbon.

4. The process of claim 1 wherein the aryl group is phenyl, alkylphenyl in which the alkyl is of 1 to 12 carbon atoms of fused ring.

5. The process of claim 1 wherein the base exchange positions of the montmorillonite clay are occupied predominantly by Group II metal cations and the clay contains less than about 1.4 percent bond iron calculated as $Fe_2O_3$ on a dry weight basis.

References Cited
UNITED STATES PATENTS

| | | | |
|---|---|---|---|
| 2,125,310 | 8/1938 | Perkins | 260—620 |
| 2,874,193 | 2/1959 | Dijgstra | 260—620 |
| 3,363,008 | 1/1968 | Hay | 260—620 |
| 2,818,452 | 12/1957 | Mavity | 260—668 A |
| 3,293,314 | 12/1966 | Brodbeck | 260—688 A |

BERNARD HELFIN, Primary Examiner

U.S. Cl. X.R.

260—613 R, 620, 471 A; 71—107